United States Patent
Dalrymple et al.

(10) Patent No.: US 6,969,940 B2
(45) Date of Patent: Nov. 29, 2005

(54) HIGH VOLTAGE SLOT LINER FOR ELECTRICAL MOTOR

(75) Inventors: Larry V. Dalrymple, Claremore, OK (US); David G. Korte, Siloam Springs, AR (US); L. Wayne Pyron, Broken Arrow, OK (US); George C. Soukup, Broken Arrow, OK (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 10/615,099

(22) Filed: Jul. 8, 2003

(65) Prior Publication Data

US 2005/0006974 A1 Jan. 13, 2005

(51) Int. Cl.$^7$ .............................. H02K 5/00; H02K 3/36
(52) U.S. Cl. ............................... 310/215; 174/110 PM; 174/110 N
(58) Field of Search ..................... 310/215; 174/110 N, 174/110 PM

(56) References Cited

U.S. PATENT DOCUMENTS

| | | | | |
|---|---|---|---|---|
| 4,160,926 A | * | 7/1979 | Cope et al. | 310/215 |
| 5,306,976 A | * | 4/1994 | Beckman | 310/215 |
| 6,176,691 B1 | * | 1/2001 | Tsubokawa | 417/410.3 |

* cited by examiner

*Primary Examiner*—Tran Nguyen
(74) *Attorney, Agent, or Firm*—Bracewell & Giuliani LLP

(57) ABSTRACT

An electric motor has a housing with a plurality of stator discs. The discs have slots that align with one another, forming passages. A dielectric film tube inserts into the slots, each of the tubes having a continuous circumference. Each tube has a nonmeltable dielectric film layer of high temperature insulation. The dielectric film layer has overlapping edges and is bonded to a carrier layer of a meltable material. The tubes may be inserted into the slot passages by drawing a vacuum in the interior of each tube, causing it to collapse so that it can be readily inserted.

13 Claims, 2 Drawing Sheets

HIGH VOLTAGE SLOT LINER FOR ELECTRICAL MOTOR

FIELD OF THE INVENTION

This invention relates in general to electrical motors, and in particular to a high voltage dielectric film tube that is located within each slot of the stator for receiving windings.

BACKGROUND OF THE INVENTION

Electrical submersible pumps for oil wells are typically driven by three-phase submersible AC electrical motors. Large submersible pump motors may be forty feet long and 7.25 inches in diameter. The motor has a stationary stator that is made up of a large number of discs or laminations stacked in the housing. Each lamination is a circular flat steel plate having a central opening through which the rotor extends. Also, each disc has a plurality of slots extending around the central opening for receiving windings.

A dielectric film lines each slot to provide a dielectric barrier between each disc and the windings that pass through the slots. The dielectric film must withstand high temperatures and voltages. One suitable type is a polyimide, however this type of insulation material does not melt or fuse to itself. It is installed in the slot by folding a long ribbon or strip of the material longitudinally with the edges overlapping.

While this insulation works well enough, because the edges overlap, an electrical leak path exists. Also, it would be desirable to reduce the thickness of the dielectric material.

SUMMARY OF THE INVENTION

In this invention, a dielectric film liner is made into a tube. The tube has a sealed outer margin or periphery. Windings are inserted through each of the tubes. In one embodiment, the tube is made up of a polyimide that is bonded to a layer of a high temperature thermoplastic polymer. The thermoplastic polymer will melt and fuse to form a continuous tube.

In one method of installing the tube, the tube is initially collapsed so that it can be inserted into the slot passage. The tube may be collapsed by closing one end and drawing a vacuum from the other end. The tube is inserted while in the collapsed position. Then once it reaches the other end, the vacuum is relieved, allowing the tube to spring back to an open configuration. If necessary, a momentary positive charge of air pressure may be employed to cause the tube to reflect back to the open configuration. Other methods of installing the tube may be used such as simply pulling the tube into the slot with or without collapsing it and with or without the use of lubricants.

DETAILED DESCRIPTION OF THE PREFERRED EMBODIMENT

Figure 1:
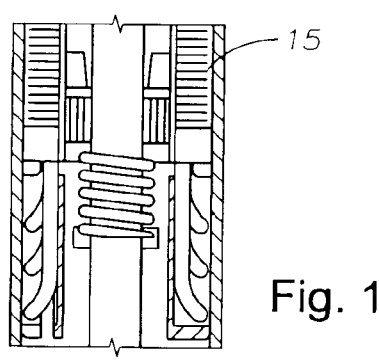
FIG. 1 is a sectional view of a portion of an electric motor constructed in accordance with this invention.
Figure 2:
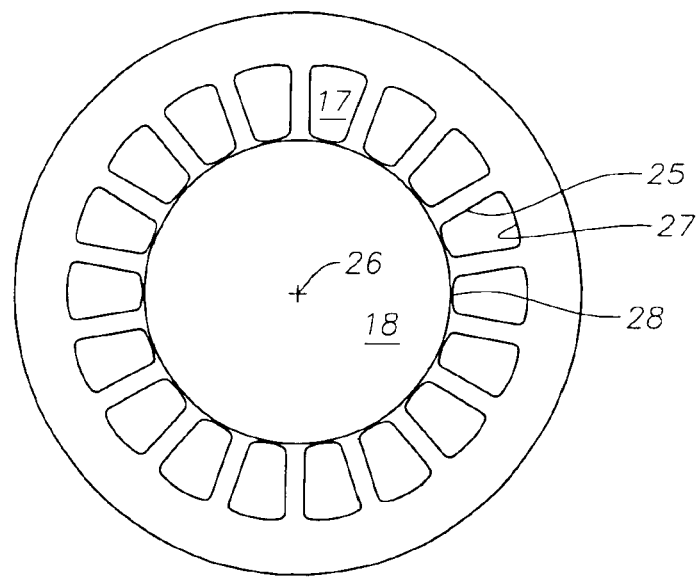
FIG. 2 is a top view of a stator disc of the motor of FIG. 1.

Referring to FIG. 1, motor 11 has a cylindrical housing 13 with a plurality of stator discs 15 stacked stationarily therein to form a stator 14. As shown in FIG. 2, each stator disc 15 has a plurality of slots 17 spaced around a central opening 18. A plurality of windings 19 extend through each slot 17. Windings 19 are copper wires, each having a coating of electrical insulation material. Motor 11 also has an axially extending shaft 21 that has a rotor 23. Rotor 23 rotates within central aperture 18 of discs 15.

Referring to FIG. 2, slots 17 may be of a variety of configurations and may either be open to central aperture 18 or closed. In this example, each slot 17 has a pair of side edges 25. Each side edge 25 is straight and located generally on a radial line emanating from axis 26 of housing 13. Each slot 17 has an outer edge 27 that is curved with a radius that is equal to the distance from outer edge 27 to axis 26 of housing 13. Each slot 17 has an inner edge 28 that is spaced close to central aperture 18, and in this embodiment, curved in an opposite direction to outer edge 27.

A dielectric tube 29 inserts into each slot 17 to form a liner to insulate windings 19 from stator discs 15. Dielectric tube 29 has a length that extends the full length of stator 14. The sidewall of dielectric tube 29 extends a full 360°, defining a sealed outer margin. The material of tube 29 is resilient but does not stretch.

Figure 4:
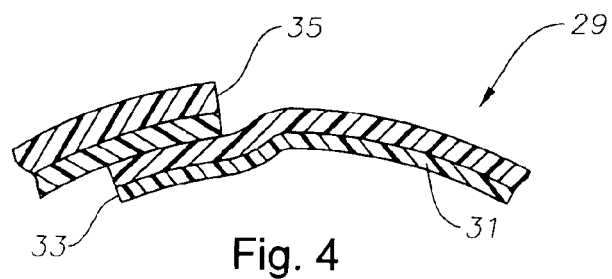
FIG. 4 is an enlarged schematic view of a portion of the tube of FIG. 3 and showing the two layers of the tube greatly exaggerated in thickness.

Referring to FIG. 4, dielectric tube 29 includes a dielectric film 31 that has a high dielectric strength at the normal operating temperatures of motor 11, which may reach several hundred degrees F. The film may be of various materials, and in the preferred embodiment, is a polyimide marketed under the trademark Kapton by E. I. DuPont de Nemours and Co., Wilmington, Del. Dielectric film 31 will not melt nor fuse to itself.

A carrier layer or film 35 is bonded to dielectric film 31 to form a continuous sealed sidewall for tube 29 and hold tube 29 in a cylindrical configuration. Carrier film 35 may be of various thermoplastic materials, but is preferably a material that will withstand the normal operating temperatures but also melts or fuses to itself at temperatures in excess of the normal operating temperatures of motor 11. Various materials are suitable, and in the preferred embodiment, carrier film 35 is a fluoropolymer, specifically fluorinated ethylene propylene (FEP). Other acceptable materials include perflouroalkoxy (PFA) and perflouro methyl vinyl ether copolymerized with tetrafluoroethylene. During manufacturing, carrier layer 35 along with dielectric film 31 is spirol wound into a tube, creating edges 33 that overlap. The overlapped edges 33 are then fused by heat or another suitable process to form a cylinder. FIG. 4 shows carrier film 35 forming the exterior of tube 29, but it could alternately be located on the interior.

Figure 5:
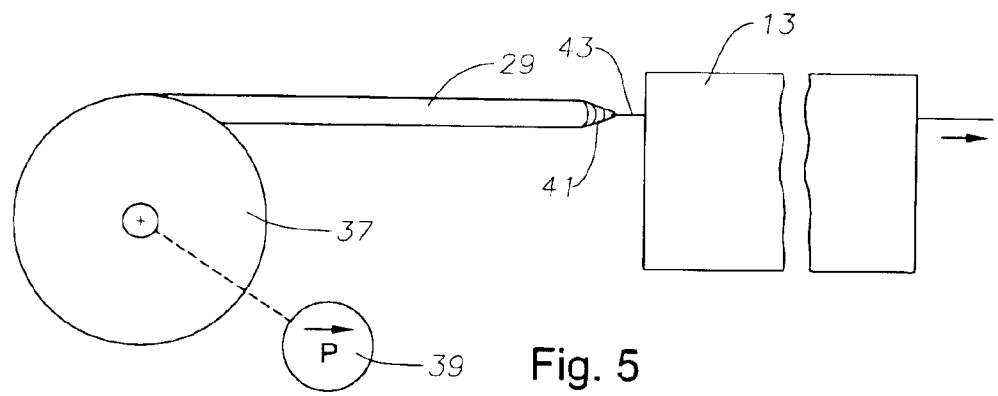
FIG. 5 is a schematic view of a method for inserting the dielectric tubes into the slots of the stator of the motor of FIG. 1.

FIG. 5 illustrates one process for installing dielectric tubes 29 in motor 11. A length of dielectric tube 29 is wrapped about a reel 37. The end of tube 29 on reel 37 is connected by a manifold to a vacuum pump 39. The opposite end 41 is folded over and sealed. End 41 is also secured to a tow line 43 that may be a wire. Tow line 43 is inserted through one of the passages defined by slots 17 prior to securing it to closed end 41.

Figure 3:
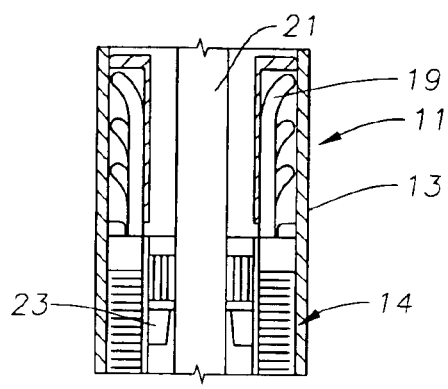
FIG. 3 is a sectional view of a dielectric tube for insertion into one of the stator slots of the motor of FIG. 1.
Figure 3:
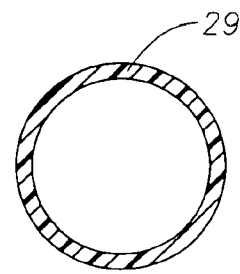
Figure 6:
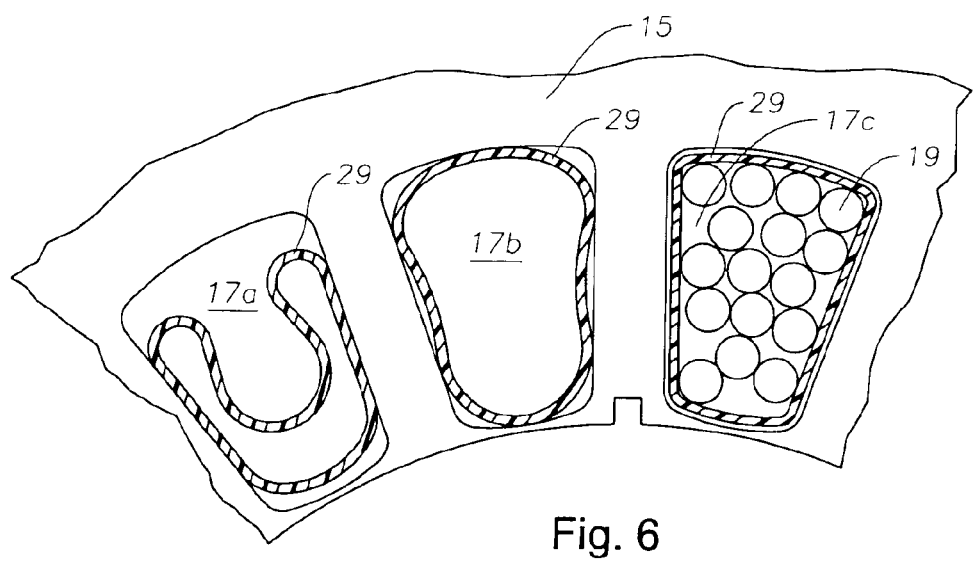
FIG. 6 is an enlarged view of a portion of the stator of the motor of FIG. 1, showing dielectric tubes during three stages of the installation.

The operator operates vacuum pump 39 to withdraw air from dielectric tube 29. This causes tube 29 to collapse from the cylindrical configuration of FIG. 3 to a longitudinally folded over configuration generally as shown in slot 17a of FIG. 6. In this configuration, the sidewalls of tube 29 are folded over one another. The initial diameter of tube 29 as shown in FIG. 3 is greater than the dimension between two side edges 25 of slots 17, thus collapsing tube 29 facilitates its introduction into the passage defined by slot 17.

Once inserted, the operator relieves vacuum 39 to allow atmospheric pressure to enter tube 29. The natural resiliency of the material of tube 29 urges it to spring outward to return back to the cylindrical configuration of FIG. 3. Tube 29 is prevented from returning to the cylindrical configuration, however by contact with side edges 25, outer edge 27 and inner edge 28 as shown in slot 17b. If necessary, the operator may discharge positive pressure above atmospheric into tube 29 to cause it to open up from the collapsed position of slot 17a to the position shown in slot 17b of FIG. 6. The operator cuts the length of tube 29 at the desired distance after tube 29 is inserted through a column of slots 17 within stator 14.

The operator then begins inserting windings 19 through each tube 29. Windings 19 are tightly packed within tube 29, as indicated in slot 17c, causing it to assume generally the cross-sectional configuration of slot 17. A portion of tube 29 will be substantially flush with each side edge 25 and the inner and outer edges 28 and 27. The diameter of tube 29 is initially selected so that its cross-sectional area is the same as the cross-sectional area of each slot 17. Also, the circumference of tube 29 equals the linear distance around the perimeter of slot 17. Slot 17c shows tube 29 in a finally installed condition.

The thickness of tube 29 is considerably smaller than the liners used with of the prior art technique utilizing the same material. In one embodiment, the wall thickness of tube 29 is in the range from 3 mils (0.0003 inch) to 9 mils and preferably 4.5 mils. The preferred thickness of dielectric film 31 is from 1 to 3 mils. In the prior art, the thickness of the dielectric film was approximately 12 mils.

The invention has significant advantages. Utilizing a continuous wall tube, rather than a folded over ribbon or strip, enables the thickness of the liner to be reduced. The dielectric tube provides substantially the same dielectric strength as the prior art liner, yet it is thinner. This allows more space for windings. The amount of copper in the windings can be increased, therefore increasing the power of the motor. The continuous wall tube does not have a leak path, unlike the folded over liner of the prior art.

While the invention has been shown only one of its forms, it should be apparent to those skilled in the art that it is not so limited but susceptible to various changes without departing from the scope of the invention.

What is claimed is:

1. An electrical motor, comprising:

a housing;

a plurality of discs stacked within the housing to form a stator, the discs having slots that align with one another to form passages;

a tube of dielectric film inserted within each of the passages, each of the tubes defining a sealed outer margin;

a plurality of windings inserted through each of the tubes; and wherein the dielectric film of each of the tubes is non-meltable and is bonded to a carrier layer of a meltable material.

2. The motor according to claim 1, wherein the dielectric film of each of the tubes has overlapping edges and the carrier layer is of a thermoplastic material.

3. The motor according to claim 1, wherein the slots have side edges that are straight and outer edges that are curved, and wherein the tubes have portions that are substantially flush with the side edges and the outer edges.

4. The motor according to claim 1, wherein a wall thickness of the tube is in the range from 0.003 to 0.009 inch.

5. The motor according to claim 1, wherein each of the tubes has a cross-sectional area that is substantially equal to a cross-sectional area of each of the slots.

6. An electrical motor, comprising:

a housing;

a plurality of discs stacked within the housing to form a stator, the discs having slots that align with one another to form passages;

a tube inserted within each of the passages, each of the tubes having a layer of a dielectric film that has overlapping edges and which is bonded to a layer of a material that fuses to the dielectric film to form a continuous sidewall; and a plurality of windings inserted through each of the tubes.

7. The motor according to claim 6, wherein each of the slots has two side portions that are straight and an outer edge portion that is curved, and wherein each of the tubes has straight portions that are substantially flush with the side portions, and a curved portion substantially flush with the outer edge portion.

8. The motor according to claim 6, wherein each of the tubes has a wall thickness in the range from 0.003 to 0.009 inch.

9. The motor according to claim 6, wherein each of the tubes has a circumference that is substantially equal to a perimeter of each of the slots.

10. The motor according to claim 6, wherein the dielectric film of the tube comprises polyimide.

11. An electrical motor, comprising:

a housing;

a plurality of discs stacked within the housing to form a stator, the discs having slots that align with one another to form passages;

a plurality of tubes, each of the tubes being inserted into one of the passages and comprising a layer of dielectric film and a layer of carrier material that are spiral wound together to create overlapping edges, the overlapping edges being heat fused together to form a continuous sidewall; and a plurality of windings inserted through each of the tubes.

12. The motor according to claim 11, wherein the dielectric film of each of the tubes is formed of polyimide and the carrier film of each of the tubes is formed of a thermoplastic material.

13. The motor according to claim 11, wherein the dielectric of each of the tubes is formed of polyimide and the carrier film of each of the tubes if formed of a fluoropolymer.

* * * * *

UNITED STATES PATENT AND TRADEMARK OFFICE
CERTIFICATE OF CORRECTION

PATENT NO. : 6,969,940 B2
DATED : November 29, 2005
INVENTOR(S) : Larry V. Dalrymple et al.

It is certified that error appears in the above-identified patent and that said Letters Patent is hereby corrected as shown below:

Column 1,
Line 49, delete "reflect" and insert -- deflect --.

Column 4,
Line 60, before "of each" insert -- film --.

Signed and Sealed this

Fourth Day of April, 2006

JON W. DUDAS
*Director of the United States Patent and Trademark Office*